United States Patent [19]
Jones

[11] Patent Number: 5,794,435
[45] Date of Patent: Aug. 18, 1998

[54] STABLE-COMBUSTION OXIDIZER VAPORIZER FOR HYBRID ROCKETS

[75] Inventor: H. Stephen Jones, Lacombe, La.

[73] Assignee: Lockhhed Martin Corporation, Bethesda, Md.

[21] Appl. No.: 597,883

[22] Filed: Feb. 7, 1996

[51] Int. Cl.⁶ .................................................. F02K 9/28
[52] U.S. Cl. .................... 60/251; 60/257; 60/260; 60/259; 60/39.821
[58] Field of Search .................... 60/250, 251, 257, 60/258, 259, 260, 220, 726, 39.48, 39.821, 39.823

[56] References Cited

U.S. PATENT DOCUMENTS

| | | | |
|---|---|---|---|
| 2,996,880 | 8/1961 | Greiner | 60/251 |
| 3,136,119 | 6/1964 | Avery | 60/251 |
| 3,178,885 | 4/1965 | Loughran | 60/251 |
| 3,295,323 | 1/1967 | Holzman | 60/251 |
| 3,334,489 | 8/1967 | Vilet | 60/251 |
| 3,340,691 | 9/1967 | Mangum | 60/251 |
| 3,443,475 | 5/1969 | Berton | 60/251 |
| 3,518,828 | 7/1970 | Bradford et al. | 60/39.82 |
| 3,595,020 | 7/1971 | Unterhaching et al. | 60/204 |
| 3,613,583 | 10/1971 | Lai et al. | 60/251 |
| 3,782,112 | 1/1974 | Muzzy | 60/251 |
| 3,788,069 | 1/1974 | Schmidt | 60/207 |
| 3,789,610 | 2/1974 | Stone | 60/245 |
| 3,893,294 | 7/1975 | Bruun et al. | 60/39.64 M |
| 3,943,706 | 3/1976 | Grafwallner et al. | 60/204 |
| 4,286,431 | 9/1981 | Reichard et al. | 60/39.823 |
| 4,589,253 | 5/1986 | Wager | 60/259 |
| 5,010,730 | 4/1991 | Knuth et al. | 60/246 |
| 5,099,645 | 3/1992 | Schuler et al. | 60/219 |
| 5,119,627 | 6/1992 | Bradford et al. | 60/251 |
| 5,133,183 | 7/1992 | Asaoka et al. | 60/204 |
| 5,152,136 | 10/1992 | Chew et al. | 60/251 |
| 5,339,625 | 8/1994 | McKinney et al. | 60/251 |
| 5,572,864 | 11/1996 | Jones | 60/251 |
| 5,582,001 | 12/1996 | Bradford et al. | 60/251 |

*Primary Examiner*—Timothy Thorpe
*Assistant Examiner*—Ted Kim
*Attorney, Agent, or Firm*—Pravel, Hewitt, Kimball & Krieger

[57] ABSTRACT

A hybrid heater vaporization system (280, 380) including hybrid heaters (250, 350) can be used to vaporize liquid oxygen as it enters a motor (200, 300) to improve the combustion characteristics of a hybrid rocket (11). The motor (200, 300) preferably includes hybrid fuel both in a substantially cylindrical portion (216, 316) in the substantially cylindrical portion of the motor and a substantially multi-toroidal shaped portion (217, 316) in the forward end of the motor (200, 300). The vaporization system (280, 380) of the present invention finally makes hybrid rockets (11) practical for aerospace applications.

27 Claims, 7 Drawing Sheets

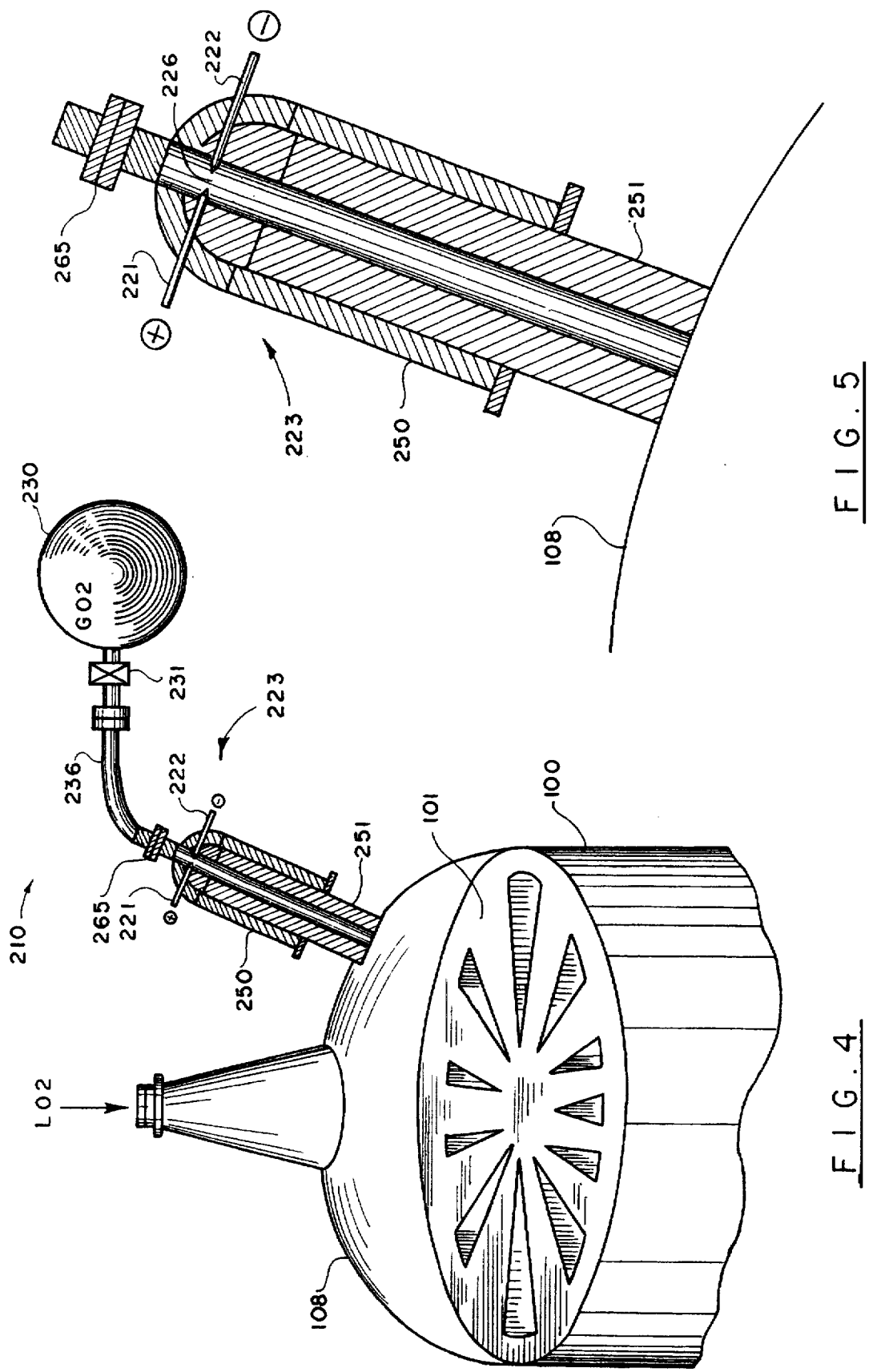

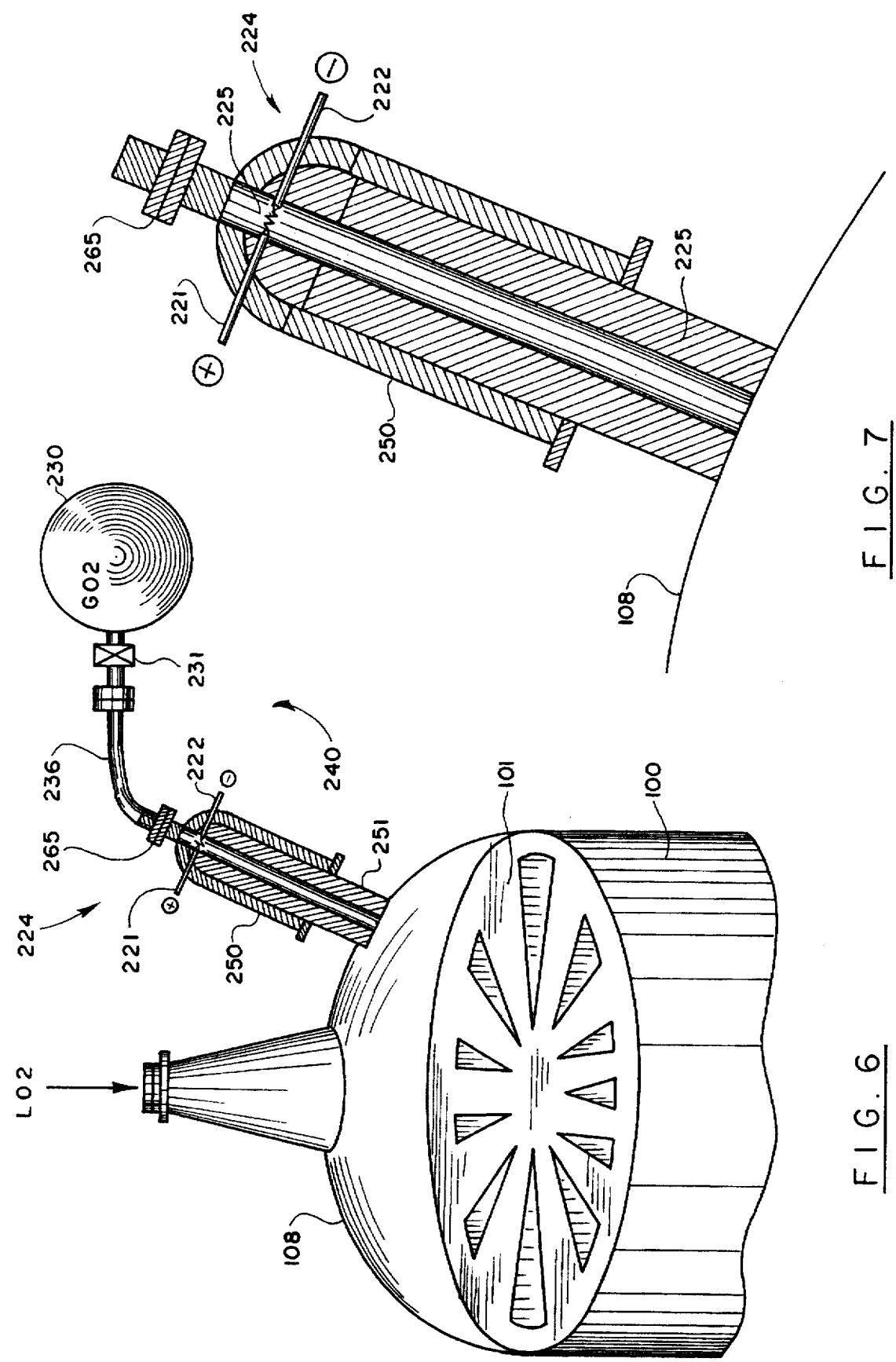

STABLE-COMBUSTION OXIDIZER VAPORIZER FOR HYBRID ROCKETS

BACKGROUND OF THE INVENTION

1. Field of the Invention

The present invention relates to pressure-fed hybrid rockets. More particularly, the present invention relates to a pressurization system for forcing oxidizer into a hybrid motor of a pressure-fed hybrid rocket, to a novel ignition system for pressure-fed hybrid rockets, and to a novel oxidizer vaporizer system for pressure-fed hybrid rockets.

2. General Background of the Invention

A pressure-fed hybrid rocket requires a pressurization system for the oxidizer tank in order to force the oxidizer out of the oxidizer tank and into the hybrid motor. Classical forward-end injection hybrids typically have a chamber pressure in the range of 300 to 700 psia. Therefore, the oxidizer tank ullage pressure for a pressure-fed hybrid rocket is in the range of 400 to 800 psia. Pressurization system size and weight impacts vehicle size and weight, therefore affecting the payload attainable.

A reliable, safe ignition system is desirable for pressure-fed hybrid rockets. Prior to the present invention, there has been no such system.

There are various types of pressurization systems, the closest prior practice to the system of the present invention being an inert gas plus combustion pressurization system. The heat source for an inert gas plus combustion pressurization system in the past has been in the form of either a catalyst or gas generator. These types of heat source tend to be relatively expensive and inefficient in heating the pressurant, whereas the hybrid helium heater concept of the present invention provides a low cost pressurization system.

Bradford et al., U.S. Pat. No. 5,119,627 contains a good discussion of pressure-fed hybrid rockets, and is hereby incorporated by reference. In the paragraph spanning columns 1 and 2, the '627 patent describes a prior art pressurization system for pressure-fed hybrid rockets which includes high-pressure non-flammable gas fed into the oxidizer tank through a regulator or throttle valve.

Bradford et al. describes a system including a tank containing helium gas under pressure, a tank containing a liquid oxidizer, for example, and a tank containing solid fuel. The helium gas under pressure travels through a conduit into the liquid oxygen tank and expels liquid oxidizer into the solid fuel tank. In Bradford et al., however, the gas is stored at ambient temperature and is not heated prior to being introduced into the oxidizer tank.

Schuler et al., U.S. Pat. No. 5,099,645, discloses a liquid-solid propulsion system including a solid fuel tank and a liquid oxygen tank wherein the liquid oxygen is heated up to become gaseous before it enters the tank containing the solid fuel, and some of the gaseous oxygen is purportedly used to push more liquid oxygen out of the liquid oxygen tank.

Schubert et al., U.S. Pat. No. 3,595,020, discloses a rocket which uses solid fuel. However, the fuel and the oxidizer are both solid. The gas produced by the combustion of the solid fuel and oxidizer pushes on a piston which causes a liquid oxidizer to be ejected from a chamber into a combustion chamber where burnable gases produced by the combustion of the solid fuel and solid oxidizer are burned.

Knuth et al., U.S. Pat. No. 5,101,730, discloses a gas-fed hybrid propulsion system which uses a turbopump to pump oxygen into contact with a solid fuel rocket.

An adequate pressurization system is just one of the requirements of a successful pressure-fed rocket. A reliable ignition system is also important, as is smooth, predictable, reliable combustion.

The fundamental principle that allows a hybrid rocket to burn is that in steady state operation, the fuel surface is constantly generating a melt layer which in turn generates vapor as more heat is added or the heat causes the fuel to sublime directly to vapor from solid phase. In the early days of hybrids, room temperature oxidizers with low heat of vaporization were used in experiments with rubber and plastic to develop the hybrid combustion theory. The considerations when using a cryogenic oxidizer like LO2 (liquid oxygen) are substantially different. The extreme cold of the LO2 can freeze the surface of the fuel, totally eliminating its ability to generate fuel. This causes low frequency oscillations in chamber pressure because of the time required to transfer heat to the cooled surface when the combustion zone travels back over a "quenched" fuel zone. That finite amount of time limits the maximum speed that the fuel vapor can be re-generated after the fuel has been quenched. Higher frequency oscillations are found when using a room temperature liquid oxidizer with a low heat of vaporization or one in gaseous form.

Many of the prior art hybrid rockets use hypergolic liquids to start them. Campbell (U.S. Pat. No. 3,116,599) uses a liquid for starting multiple times.

The hypergolic liquids used by prior art hybrid rockets are very hazardous. They spontaneously burn when exposed to oxidizer (or else they would not work) and most of them spontaneously burn when exposed to air (the oxygen in air), resulting in substantial safety risks and concerns. Any leakage of the liquid fuel will ignite the launch vehicle. Special storage and handling techniques are required to handle the liquids, resulting in substantial costs.

Hybrid propulsion rockets are safe and non-explosive (because the fuel is in solid phase and cannot explode and detonate). To employ the ignition method of the prior art, a quantity of hazardous liquid must be added to the launch vehicle, negating the principal advantage.

The hypergolic fluids can only burn if they are vaporized immediately and mix with vaporized oxidizer. The real problem is when using liquid oxygen. The cryogenic temperature of the LO2 naturally suppresses the reaction rate (which roughly doubles every 10° C.). Further aggravating the problem, hypergolic liquids typically have a relatively high freezing temperature. Triethyl aluminum, for instance, freezes at 59° F. The introduction of a large quantity of LO2 into a hybrid creates a region in which the temperature is effectively cryogenic. Initially, the LO2 comes in contact with ambient (i.e. warm) surfaces and vaporizes. Once the surface heat has been removed, the spray has little opportunity to vaporize. In such a cold predominately liquid LO2 stream, the hypergolic liquid cannot be vaporized (as it requires thermal energy to change phase), in fact, it is more likely that it is frozen (since these liquids have a high freezing point). The residence time in the head end is very small, and the frozen hypergolic fuel does not have enough time to vaporize, mix and burn. The frozen hypergolic fuel is then swept down into the port of the hybrid motor where it eventually thaws, vaporizes and burns with oxygen.

As the cold oxygen travels down the port, it will eventually be vaporized and will allow continuous combustion with the hybrid grain. The more LO2 that is fed down a given unit area of port (oxygen flux), the farther down the port the steady state combustion zone will be. The farther down the port the steady state combustion zones, the higher the potential amplitude of unstable combustion response. If the distance is zero, the unstable amplitude due to this mechanism is also zero.

Analytical methods show that, even for low oxygen flux, the zone can be located deep into the port. Combustion instability is caused by the oscillation of the combustion zone forward, which generates more fuel to burn (surface area exposed to combustion), resulting in a higher pressure, and rearward which allows the cold oxygen to quench the fuel surface and eliminate its ability to generate flammable fuel vapor. The highest possible frequency of oscillation due to this phenomena is limited by how quickly the fuel surface can be re-heated as the combustion zone returns forward. The inherent stability of the hybrid combustion process (i.e. no destructive high-frequency oscillations that are catastrophic in liquid motors) is due to this time delay.

Various patents of interest relating to ignition systems and to vaporizing liquid oxidizer are discussed below.

Bradford et al., U.S. Pat. No. 3,518,828, discloses a hybrid rocket ignition system which directs the fuel-rich combustion products of a small solid propellant igniter into the recirculation region 32 around an oxidizer spray 33 in the rocket case. Once the solid propellant 43 ignites, it cannot be extinguished until it is consumed. This negates one of the most important safety features of hybrid rockets—the ability to start and stop the rocket's combustion at will. Also, solid propellant is relatively dangerous and can be ignited accidentally.

Holzman, U.S. Pat. No. 3,295,323, discloses a means for vaporizing LO2 inside a rocket case; however, the LO2 is vaporized while in tubing.

Avery, U.S. Pat. No. 3,136,119, discloses an ignition system for a solid-oxidizer hybrid rocket which directs air or oxygen into or around an incoming liquid fuel stream (see especially col. 5, lines 22–25)—it is not in direct contact with the combustion gases.

Muzzy, U.S. Pat. No. 3,782,112, discloses a system for gasifying and aerating a liquid oxidizer before it enters a hybrid rocket. While the details are sketchy, it appears that solid propellant 18 somehow generates a "very hot gas" which passes through openings 21 and 22 and mixes with the liquid oxidizer. However, note that this mixing of the "very hot gas" and the liquid oxidizer occurs prior to entry of the oxidizer in the combustion chamber. Also, as does the apparatus of Bradford et al., it uses a solid propellant, which is relatively dangerous and can be ignited accidentally. Further, the solid propellant cannot be shut off and restarted.

Greiner, U.S. Pat. No. 2,996,880, discloses a rocket which is ignited using electrical resistance (either the solid fuel or a separate resistor can be used to produce the necessary resistance).

Mangum, U.S. Pat. No. 3,340,691, discloses a system in which a solid propellant is ignited electrically, then both pressurizes liquid and mixes with the liquid and directs the liquid against a solid barrier with which the liquid reacts.

Lai et al., U.S. Pat. No. 3,613,583, discloses a flare which uses methane as an ignition fuel, which would be dangerous in a rocket.

Bruun et al., U.S. Pat. No. 3,613,583, discloses a monopropellant thrustor which includes tubes in a thermal bed. Hot gases pass through the tubes to help heat the bed to enhance decomposition.

Schuler et al., U.S. Pat. No. 5,099,645 (also discussed above), discloses a liquid-solid propulsion system including a solid fuel tank and a liquid oxygen tank wherein the liquid oxygen is heated up to become gaseous before it enters the tank containing the solid fuel. Further, in Schuler et al., the liquid oxygen is heated in a heat exchanger, and does not come in direct contact with the exhaust stream of the hybrid heater.

Knuth et al., U.S. Pat. No. 5,101,730 (also discussed above), discloses a gas-fed hybrid propulsion system which uses a turbopump to pump oxygen into contact with a solid fuel rocket. In Knuth et al., the LO2 and a fluid fuel are mixed in a preburner 7 to heat and gasify the oxygen.

SUMMARY OF THE INVENTION

The apparatus of the present invention solves the problems confronted in the art in a simple and straightforward manner.

Helium stored at cryogenic temperatures and then heated before it enters the oxidizer tank, provides a volumetrically and thermodynamically efficient stored gas pressurization system. This specification describes the use of a hybrid helium heater pressurization system for a pressure-fed hybrid rocket.

Another inert gas or other propellant, such as nitrogen, which will not react with the propelled fuel component and which will not liquify at the temperatures specified herein, could be used instead of helium, though helium is preferred.

The present invention comprises apparatus including a hybrid heater pressurization system, for a rocket comprising a first liquid fuel component and a second fuel component, comprising pressurization means, for forcing the first liquid fuel component into contact with the second fuel component, the pressurization means comprising a gas initially stored at a cryogenic temperature, a hybrid heater having combustion products when ignited for heating the gas by mixing the combustion products of the hybrid heater with the gas, and diffuser means for introducing the heated gas into a container containing the first liquid fuel component.

The gas is preferably inert, and is most preferably helium. The rocket is preferably a hybrid rocket.

The apparatus of the present invention can include the rocket. The apparatus preferably further comprises an electric ignition system for electrically igniting the rocket, which can include a second hybrid heater having combustion products when ignited, the combustion products of the second hybrid heater entering a casing containing the second fuel component when the second hybrid heater is ignited, and ignition means for igniting the second hybrid heater. The ignition means preferably has no or low ignition potential when in air or an inert-gas environment, and most preferably produces a carbon arc. The second hybrid heater is preferably positioned such that its exhaust stream intersects with the path of the incoming liquid oxidizer into the casing. Extended-burn means can also be provided for allowing the second hybrid heater to remain on during the entire burn to enhance combustion of the hybrid rocket by pre-heating the oxygen as it enters the casing containing the second fuel component. The extended-burn means can include, for example, a tank containing a quantity of GO2 sufficient to supply the second hybrid heater during the entire rocket burn. The extended-burn means can alternatively include, for example, suitable piping and valving to direct LO2 from the LO2 tank into the second hybrid heater.

Another embodiment of the present invention is an ignition system for igniting a rocket, the rocket comprising a first fuel component and a second fuel component, wherein the second fuel component is in a casing, and the ignition system comprises a hybrid heater having combustion products when ignited, the hybrid heater being connected to the casing and positioned such that the combustion products of the second hybrid heater enter the casing of the second fuel component when the hybrid heater is ignited, and ignition means for igniting the hybrid heater. The ignition means preferably has no or low ignition potential when in air or an inert-gas environment, and most preferably produces a carbon arc.

In another embodiment of the present invention, a hybrid rocket comprises: a rocket case having a first end and a second end; a hybrid motor in the rocket case, adjacent the second end of the rocket case; fuel in the hybrid motor; a tank in the rocket case, intermediate the hybrid motor and the first end of the rocket case, the tank being fluidly connected to the hybrid motor and being at a first, ullage, pressure; liquid oxygen in the tank; a nozzle connected to the second end of the rocket case; a first sphere in the rocket case, intermediate the first end of the rocket case and the tank, the first sphere initially containing helium at a second pressure which is higher than the first pressure and at a cryogenic temperature; a second sphere in the rocket case, intermediate the first end of the rocket case and the tank, the second sphere initially containing gaseous oxygen at a third pressure which is higher than the second pressure; a first hybrid heater for heating the helium initially stored in the first sphere, the first hybrid heater being fluidly connected to the tank, the first hybrid heater generating exhaust when ignited and being positioned such that its exhaust enters the tank; a first gas line for allowing helium to flow from the first sphere to the first hybrid heater; a second gas line for allowing oxygen gas to flow from the second sphere to the first hybrid heater; a second hybrid heater connected to the first sphere, the second hybrid heater generating exhaust when ignited and being positioned such that its exhaust enters the first sphere; a third gas line for allowing oxygen gas to flow from the second sphere to the first sphere; a plurality of pressure transducers for detecting the ullage pressure in the tank; a pressure control mechanism in communication with the pressure transducers; a ganged control valve in communication with the pressure control mechanism, the ganged control valve controlling the flow of helium and oxygen gas from the first sphere and the second sphere, respectively, into the first hybrid heater, in response to the ullage pressure in the tank as detected by the pressure transducers; and a diffuser in the tank for diffusing in the tank helium that has been heated in the first hybrid heater. The rocket further comprise an electric ignition system for electrically igniting the rocket. The electric ignition system for electrically igniting the rocket can include a third hybrid heater having combustion products when ignited, the combustion products of the third hybrid heater entering the casing of the second fuel component when the third hybrid heater is ignited; ignition means are provided for igniting the third hybrid heater. The ignition means preferably has no or low ignition potential when in air or an inert-gas environment. It is preferably produces a carbon arc.

Another embodiment is a method of pressurizing a rocket comprising a first liquid fuel component and a second fuel component with pressurization means to force the first liquid fuel component into contact with the second fuel component, comprising the following steps: storing an inert gas initially at a cryogenic temperature; heating the inert gas with a hybrid heater having combustion products when ignited by mixing the combustion products of the hybrid heater with the gas; and introducing the heated inert gas into a container containing the first liquid fuel component.

Yet another embodiment of the present invention is a method of igniting a rocket comprising a first liquid fuel component and a second fuel component, wherein the second fuel component is in a casing, comprising the following steps: providing a hybrid heater having combustion products when ignited; connecting the hybrid heater to the casing; positioning the hybrid heater such that the combustion products of the hybrid heater enter the casing of the second fuel component when the hybrid heater is ignited; and electrically igniting the hybrid heater, which in turn ignites the rocket. The method can further comprise the steps of immersing in an inert-gas environment an ignition means which has no or very low ignition potential when in air or an inert-gas environment and causing an oxidizer to contact the ignition means to cause ignition; alternatively, the method could comprise the steps of immersing in an oxygen-containing environment an ignition means which has an ignition potential when electricity is supplied thereto and supplying electricity to the ignition means to produce ignition; in either case, the ignition means preferably produces a carbon arc.

A further embodiment of the present invention is a system for and method of improving the combustion of hybrid rockets by vaporizing liquid oxidizer as it enters the motor. The system for improving combustion of a hybrid rocket containing a solid fuel comprises means for gasifying liquid oxygen (LO2) as it enters the hybrid motor, before it contacts the solid fuel. The means for gasifying LO2 preferably comprises an O2-driven hybrid heater whose exhaust stream intersects and mixes directly with the LO2 stream as the LO2 stream enters the motor and means for supplying O2 to the hybrid heater during substantially the entire duration of the rocket burn. Preferably the system further comprises electric means for igniting the hybrid heater.

The method of improving combustion of a hybrid rocket by gasifying liquid oxygen (LO2) as it enters the hybrid motor, before it contacts the hybrid fuel, comprises connecting at least one O2-driven hybrid heater to the motor such that its exhaust stream intersects and mixes directly with the LO2 stream as the LO2 stream enters the motor and providing O2 to the hybrid heater during substantially the entire burn of the rocket. The hybrid heater is preferably ignited with electrical current. There can be as few as one heater and as many as desired. For example, there can be three heaters, equally spaced around the top (forward end) of the motor.

The present invention allows hybrid rockets to burn steadily, safely, and completely, a combination which could not heretofore be accomplished.

It is an object of the present invention to provide a pressurization system for pressure-fed hybrid rockets which is relatively small and light-weight when compared to currently available pressurization systems.

It is a further object of the present invention to provide a pressurization system for pressure-fed hybrid rockets which is relatively inexpensive when compared to currently available pressurization systems.

It is another object of the present invention to provide a safe, reliable ignition system for rockets. It is important that rockets light cleanly, and a rocket ignited with the ignition system of the present invention will light cleanly.

A further object of the present invention is to provide a system for and method of heating liquid oxygen to vaporize it as it enters a hybrid rocket motor to allow it to better combust with the hybrid fuel in the rocket motor.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 4 shows a first embodiment of the rocket ignition system and oxidizer vaporizer of the present invention attached to the hybrid motor;

FIG. 5 is a detail of the system of FIG. 4;

FIG. 6 shows an alternative embodiment of the rocket ignition system of the present invention attached to the hybrid motor;

FIG. 7 is a detail of the system of FIG. 6;

PARTS LIST

Figure 1:
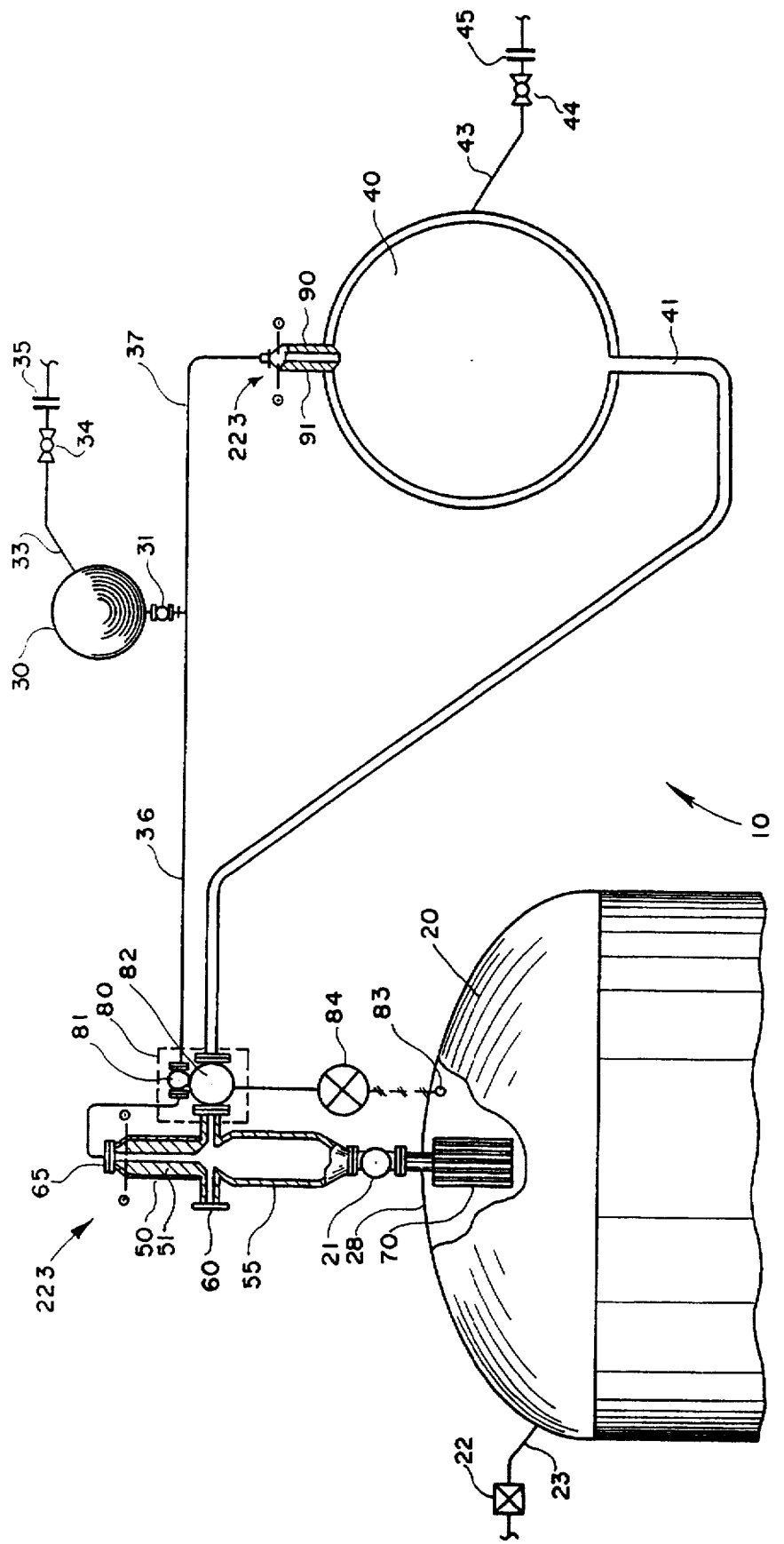
FIG. 1 is a schematic view of the hybrid helium heater pressurization system of a first embodiment of the apparatus of the present invention.

The following is a list of suitable parts and materials for the various elements of the preferred embodiment of the present invention.

10 hybrid helium heater pressurization system of the present invention
11 hybrid rocket of a preferred embodiment of the apparatus of the present invention
20 oxidizer tank (700 cubic foot capacity containing liquid oxygen (LO$_2$))
21 isolation valve for oxidizer tank 20
22 vent/relief valve for oxidizer tank 20
23 vent/relief line for oxidizer tank 20
24 LO2 stream
28 first end of tank 20
29 second end of tank 20
30 sphere containing gaseous oxygen (GO$_2$)
31 isolation valve for GO$_2$ tank 30
33 GO$_2$ fill/drain, vent/relief line for GO$_2$ tank 30
34 GO$_2$ fill/drain, vent/relief valve for GO$_2$ tank 30
35 ground interface/quick-disconnect valve for GO$_2$ tank 30
36 gaseous oxygen feedline for hybrid helium heater 50
37 gaseous oxygen feedline for hybrid helium tank heater 90
40 Weldalite 049™ GHe sphere
41 helium feedline for hybrid helium heater 50
43 helium fill/drain, vent/relief line for helium tank 40
44 helium fill/drain, vent/relief valve for helium tank 40
45 ground interface/quick-disconnect valve for helium tank 40
50 hybrid helium heater used to heat the cold gaseous helium from tank 40 to pressurize main liquid oxygen tank 20
51 solid fuel in hybrid helium heater 50
55 mixing chamber of hybrid helium heater 50 for mixing hybrid heater hot combustion products and cold gaseous helium
58 first end of hybrid helium heater 50

59 second end of hybrid helium heater 50
60 inlets for helium into hybrid helium heater 50
65 inlet for GO$_2$ into hybrid helium heater 50
70 gaseous helium diffuser
80 ganged control valve for hybrid helium heater 50
81 GO$_2$ valve in ganged control valve 80 in gaseous oxygen line 36
82 helium valve in ganged control valve 80 in gaseous helium line 41
83 pressure transducers (three in number)
84 control module for ganged valve 80 (pressure control mechanism)
90 hybrid helium pressurant tank heater (used to pressurize the cold gaseous helium in helium tank 40)
91 solid fuel in hybrid helium pressurant tank heater 90
100 hybrid motor
101 fuel in hybrid motor 100
108 first end of hybrid motor 100
109 second end of hybrid motor 100
110 intertank
111 nozzle
112 liquid injection thrust vector control valves (LITVC)
115 rocket case
118 first end of rocket case
119 second end of rocket case
120 main oxygen valve
130 ports in fuel 101
131 central port in fuel 101
200 motor
201 fuel in motor 200
210 hybrid heater ignition system for hybrid motor 100
216 substantially cylindrical portion of fuel 201 in motor 200
217 substantially multi-toroidal shaped portion of fuel 201
221 carbon electrode
222 carbon electrode
223 preferred ignition system for hybrid heaters 50, 90, 250
224 alternative ignition system for hybrid heaters 50, 90, 250
225 filament of system 224
226 gap of system 223
230 sphere containing gaseous oxygen (GO$_2$)
231 isolation valve for GO$_2$ tank 30
236 gaseous oxygen feedline for hybrid helium heater 250
240 alternative hybrid heater ignition system for hybrid motor 100
250 hybrid heater used to ignite motor 100
251 solid fuel in hybrid heater 250
252 cylindrical bore in substantially multi-toroidal shaped portion 217 of fuel 201
265 inlet for GO$_2$ into hybrid heater 250
270 exhaust stream from hybrid heater 250
276 piping
277 piping
278 GO2 valve
279 orifices
280 hybrid heater vaporization system
300 motor
301 fuel in motor 300
302 casing of motor 300
316 substantially cylindrical portion of fuel 301 in motor 300
317 substantially multi-toroidal shaped portion of fuel 301
330 cylindrical openings formed in substantially multi-toroidal-shaped portion 317 of solid fuel 301 in the front end of motor 300
331 central cylindrical bore 331 in the aft end of head end portion 317 of fuel 301

332 second, larger diameter bore in the aft end of head end portion 317 of fuel 301
333 aft-projecting toroidal surface of head end portion 317 of fuel 301
334 forward projecting toroidal surface of head end portion 317 of fuel 301
335 choroidal surface of forward portion 317 of fuel 301
336 forward surface of portion 316 of fuel 301
350 hybrid heater used to ignite motor 300
365 inlet for $GO_2$ into hybrid heater 350
370 exhaust stream from hybrid heater 350
375 injector
380 hybrid heater vaporization system
390 rearward facing step
394 arrows
395 low-flux regions of motor 300
400 motor
401 fuel in motor 400
402 casing of motor 400
416 substantially cylindrical portion of fuel 401 in motor 400
417 substantially multi-toroidal shaped portion of fuel 401
430 cylindrical openings formed in substantially multi-toroidal-shaped portion 417 of solid fuel 401 in the front end of motor 400
431 central cylindrical bore 431 in the aft end of head end portion 417 of fuel 401
432 second, larger diameter bore in the aft end of head end portion 417 of fuel 401
433 aft-projecting toroidal surface of head end portion 417 of fuel 401
434 forward projecting toroidal surface 434 of head end portion 417 of fuel 401
435 choroidal surface 435 of forward portion 417 of fuel 401
436 forward surface of portion 416 of fuel 401
450 hybrid heater used to ignite motor 400
470 exhaust stream from hybrid heater 450
475 injector
476 piping
480 hybrid heater vaporization system
490 rearward facing step
494 arrows showing direction of flow of GO2
495 low-flux regions of motor 400

DETAILED DESCRIPTION OF THE PREFERRED EMBODIMENTS

Figure 2:
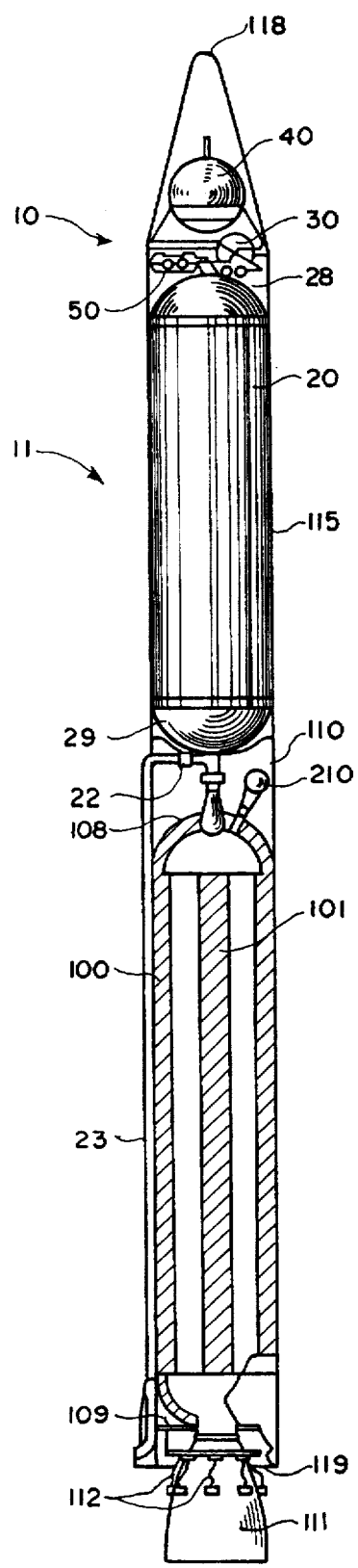
FIG. 2 is a schematic view of the hybrid rocket of the first embodiment of the apparatus of the present invention.
Figure 3:
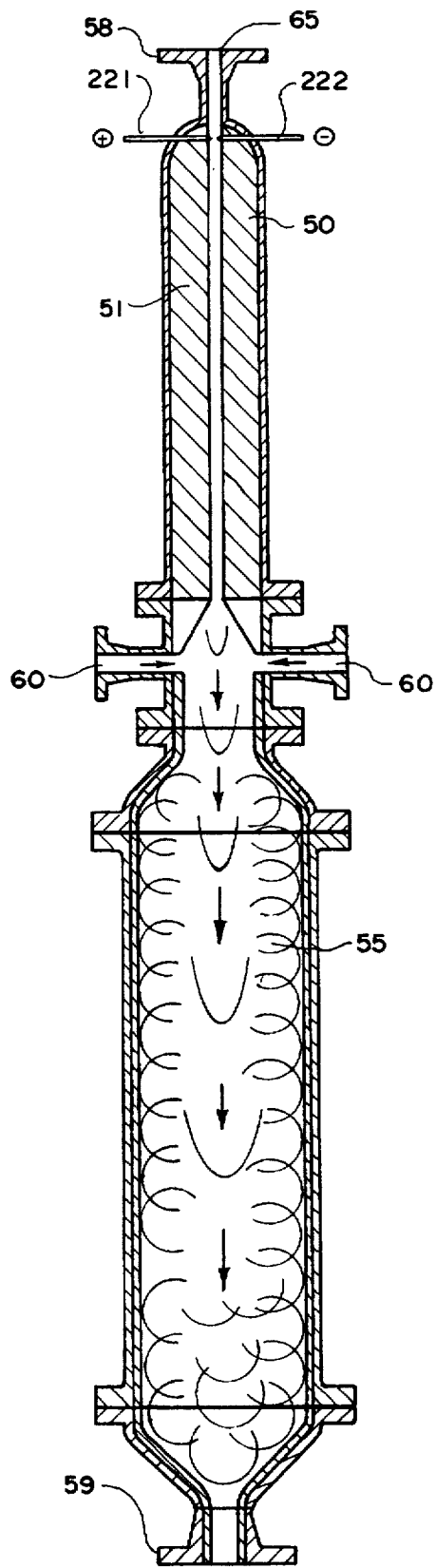
FIG. 3 is a detail of the hybrid helium heater pressurization system of the first embodiment of the apparatus of the present invention.

FIGS. 1 through 3 illustrate a preferred embodiment of the pressurization system apparatus of the present invention.

FIG. 1 shows the hybrid helium heater pressurization system 10 of the present invention. It will be described after rocket 11 is described.

FIG. 2 shows a pressure-fed hybrid rocket 11 having an oxidizer tank 20 and a hybrid motor 100 which requires a pressurization system for the oxidizer tank 20 in order to force the oxidizer out of the tank 20 and into the hybrid motor 100. Hybrid motor 100 is in a casing.

The American Rocket Company's (AMROC) H-1800 hybrid booster for AMROC's Aquila 31 launch vehicle was used as a baseline for application of the pressurization system. A drawing of a modified version of the H-1800 hybrid booster for the Aquila 31 launch vehicle along with the pressurization system of the present invention is shown in FIG. 2. The pressurization analysis is based on the following parameters: a 700 cubic foot main hybrid $LO_2$ tank 20; a nominal $LO_2$ mass flow rate of 620 lbm/sec (282 kg/sec) for the hybrid motor 100; a liquid injection thrust vector control (LITVC) system 112 utilizing $LO_2$ from the main $LO_2$ tank 20 at a rate corresponding to the trajectory; and a burn time with throttle of 76 seconds.

Rocket 11 includes hybrid motor 100 having hybrid fuel 101 therein, tank 20, and an intertank 110 connecting motor 100 to tank 20. A rocket case 115 having a first, upper end 118 and a second, lower end 119 contains motor 100, tank 20, and hybrid helium heater pressurization system 10. The first, upper end 108 of hybrid motor 100 is connected to tank 20, while the second end 109 of hybrid motor 100 is connected to nozzle 111. Liquid injection thrust vector control valves (LITVC) 112 blow liquid oxygen into nozzle 111 to control the pitch and yaw of rocket 11, and are connected with appropriate means (not shown) to tank 20.

Oxidizer tank 20 has attached thereto a vent/relief valve 22 connecting tank 20 to a vent/relief line 23. Tank 20 has a first, upper end 28 and a second, lower end 29.

The hybrid helium heater pressurization system 10 of a preferred embodiment of the present invention is shown in FIG. 1.

System 10 includes a hybrid heater 50, a mixing chamber 55 for mixing hybrid heater hot combustion products and cold gaseous helium, a sphere 40 for containing helium, a sphere 30 for containing gaseous oxygen, a diffuser 70 for diffusing helium and combustion products in tank 20, and appropriate plumbing and other parts interconnecting these elements, as will be described further. Optionally, some screening mechanism could be included to filter particulates from the helium in sphere 40 to prevent the particulates from entering mixing chamber 55 (the particulates would reduce the effectiveness of the method of the present invention by absorbing heat from heater 50).

One embodiment of the present invention resides in the system 10 for pressurizing the liquid oxygen tank 20. System 10 is shown in detail in FIG. 1, and the hybrid heater 50 is shown in more detail in FIG. 3. The purpose of the pressurization system 10 of the present invention is to provide pressure at the first, upper end 28 of tank 20 in FIG. 2 so that liquid oxygen can exit the second, lower end 29. Hybrid heater 50 creates the pressure by mixing gaseous oxygen (see FIGS. 1 and 3) with the solid fuel in the hybrid heater 50 to create an extremely high temperature. Helium from sphere 40 is then mixed with the combustion products in mixing chamber 55 via an inlet 60 and this hot, inert mixture enters liquid oxygen tank 20 via a diffuser 70. A second hybrid heater 90 pressurizes the gaseous helium sphere 40. Both hybrid heaters 50 and 90 are fed gaseous oxygen from sphere 30.

Smaller hybrid heater 90, used as the pressurant tank heater, supplies sufficient energy to the helium in the storage sphere 40 to reduce the pressure decay caused by the withdrawal of the helium. Hybrid heaters 50, 90 are supplied oxidizer from a single sphere 30 containing gaseous oxygen ($GO_2$) initially stored at 5000 psia and 530° R. (70° F.). The hybrid heaters 50, 90 are ignited at ignition of the main hybrid motor 100. The pressurant (gaseous helium (GHe)) supply and hybrid heater's $GO_2$ supply are controlled by sensing main oxidizer tank 20 ullage pressure to respond to the out-flow rate of liquid oxidizer.

Hybrid helium heater 50 has a first, upper end 58 and a second, lower end 59.

Helium feedline 41 feeds helium from helium tank 40 to hybrid helium heater 50. Helium fill/drain, vent/relief line 43 and helium fill/drain, vent/relief valve 44 are used for fill/drain and vent/relief operations for tank 40. Ground interface/disconnect 45 is used as a ground hook-up for helium tank 40.

Inlets 60 for helium into hybrid helium heater 50 are located on the sides of heater 50 and inlet 65 for GO$_2$ into hybrid helium heater 50 is located at the top thereof Isolation valve 21 isolates oxidizer 20 from the pressurization system to allow pre-pressurization of the LO$_2$ oxidizer tank prior to rocket ignition.

Valves 112 blow liquid oxygen into nozzle 111 to control the pitch and yaw of rocket 11.

The purpose of diffuser 70 is to spread out the exhaust gases and helium from heater 50 so that they relatively uniformly push the LO$_2$ in tank 20.

Isolation valve 31 isolates GO$_2$ from the rest of system 10 during fill/drain operations. Isolation valve 31 also serves to prevent gases from flowing from heater 50 into sphere 30 should the pressure in sphere 30 drop below the pressure in heater 50.

There are a GO$_2$ fill/drain, vent/relief line 33, a GO$_2$ fill/drain, vent/relief vent 34, and a ground interface/disconnect 35 for GO$_2$ tank 30. Line 33 and vent 34 are used for fill/drain and vent/relief operations for tank 30.

Gaseous oxygen feedline 36 for hybrid helium heater 50 feeds gaseous oxygen from tank 30 to heater 50. Gaseous oxygen feedline 37 for hybrid helium tank heater 90 feeds gaseous oxygen from tank 30 to heater 90. Gaseous oxygen feedline 236 for hybrid heater 250 feeds gaseous oxygen from tank 230 to heater 250.

Gaseous helium which is initially stored in tank 40 at 3000 psia and 150° R. (−310° F.) is injected into hybrid helium heater 50 and exits along with the combustion products into the top of the liquid oxygen (LO$_2$) tank 20 at 1400° R. (940° F.), thus providing a very high energy pressurant.

The helium is supercritical (at such a temperature and pressure that increased pressure will only compress it more, but will not cause it to liquify), so it still is and acts as a gas; for that reason, it does not matter that line 41 is at the bottom. The fact that the gas is supercritical allows it to be denser, and thus more can fit in a smaller container. Also, there are particulates in helium sphere 40 which should be filtered out with a screen or some other filter system, because these particulates are extremely cold and will (albeit negligibly) cool off the combustion products of heater 50.

Neon, argon, nitrogen, and the inert gases (those in Group VIII of the periodic table) could be used as the pressurant. The ratio of density stored in the container to density out of container is important, and helium has the best ratio (highest); also, helium is less dense than other inert gases, so an effective amount of helium weighs less than other gases.

The hybrid helium heater 50 uses hydroxyl-terminated polybutadiene (HTPB) as the fuel 51 and is run at an oxidizer-to-fuel mixture ratio of approximately 2.0. GO$_2$ enters the heater at the forward end vaporizing and burning the HTPB as it passes down the grain. There is never any liquid or volatilized fuel that can enter the LO$_2$ tank 20. Gaseous oxygen driven hybrid motors have never exhibited any tendency for unstable combustion. A hybrid motor driven by gaseous oxygen will not extinguish until all the fuel is consumed or the oxygen flow is terminated. Once initiated, the reliability of the combustion is 100%.

Helium gas is introduced into the heater 50 at a point where nearly all the oxygen has reacted and therefore combustion of any type will be limited due to the low concentration of oxygen. The impinging streams of combustion gas and cold helium will promote highly turbulent mixing. The cold helium will quench the combustion stream and reduce the volumetric fraction of oxygen to levels which cannot support combustion. The heater's internal volume increases downstream of the helium injection port 60 to allow for the helium gas to expand and mix with the combustion products in order to promote the transfer of heat to the helium gas. The pressurant/gas mixture exits the heater 50 at approximately 1400° R. (940° F.) and enters a diffuser 70 inside the main LO$_2$ tank 20. An analysis of the thermodynamics of LO$_2$ tank 20 shows the bulk ullage temperature at the end of the burn is approximately 1200° R. (740° F.). The heater 50 outputs an average of 2000 BTU/sec, burning a total of 10 lbm (4.5 kg) of HTPB and 20 lbm (9.1 kg) of GO$_2$. The mass mole fraction of the principal combustion products are carbon monoxide 30%, carbon dioxide 26%, and H$_2$O 32%. The volume fraction of the total pressurant stream composition is: helium 97.2%, carbon monoxide (CO) 0.9% (reactive), carbon dioxide (CO$_2$) 0.5% (inert), H$_2$O 1.4% (inert), trace oxygen (reactive). In an environment of 97 percent helium there is not concern of burning hydrocarbons or any other species.

The hybrid pressurant tank heater 90 uses HTPB as the fuel 91 and GO$_2$ as the oxidizer. In this case the combustion products are the pressurant of the GHe sphere 40. The heater 90 outputs an average of 200 BTU/sec into the GHe sphere 40, therefore burning approximately one lbm (0.454 kg) of HTPB and two lbm (0.909 kg) of GO$_2$.

The GO$_2$ is stored in a 16-inch diameter sphere 30 at ambient temperature. The initial mass of GO$_2$ in the sphere 30 is approximately 32 lbm (14.5 kg). The hybrid helium heater 50 will burn 20 lbm (9.09 kg) of GO$_2$, the hybrid pressurant tank heater 90 will burn two lbm (0.909 kg) of GO$_2$, and approximately 10.0 lbm (4.55 kg) of GO$_2$ will be unusable residual in the GO$_2$ sphere 30. The pressure and temperature of the GO$_2$ sphere 30 decays from 5000 psia and 530° R. (70° F.) to 600 psia and 290° R. (−170° F.) isentropically. A ganged control valve 80 for the heater 50 adjusts the GO$_2$ flow rate, and therefore the heat output, to correspond to the helium flow rate required to fulfill the ullage pressure requirement of LO$_2$ tank 20. A constant pressurant exit temperature is maintained. The pressurant tank heater 90 does not require active control. An orifice to limit the GO$_2$ flow rate is sufficient to limit the maximum heating rate of the heater 90.

Ganged control valve 80 for hybrid helium heater 50 includes a GO$_2$ valve 81 in gaseous oxygen line 36 and a helium valve 82 in gaseous helium line 41. There are three pressure transducers 83 (although but one is shown in the drawings) which monitor pressure in liquid oxygen tank 20 and feed a signal to a control module 84 for ganged valve 80. Module 84 includes a pressure control mechanism which controls the flow of gaseous oxygen and helium to hybrid helium heater 50 by controlling the amount of gaseous oxygen and helium to flow through valve 80.

The Weldalite 049™ GHe sphere 40 is 46 inches in diameter and has a wall thickness of approximately 0.5 inch.

The novel ignition system 210 of the present invention is shown in FIGS. 4–7.

The preferred embodiment of the ignition system of the present invention, hybrid heater ignition system 210, is shown in FIGS. 4 and 5. Ignition system 210 is used to ignite hybrid motor 100. Components such as some of the components of system 210 can also be used to ignite hybrid heaters 50 and 90, as will be described further.

Ignition system 210 includes a hybrid heater 250 for igniting motor 100, a sphere 230 containing gaseous oxygen (GO$_2$), and an arc-producing ignition system 223 for igniting heater 250. Ignition system 223 includes carbon electrodes 221 and 222 separated by a small gap 226. Arc-producing ignition system 223 produces an arc with combustible carbon ions (not simply an electric spark) as electricity flows through it from one electrode 221 to another 222. While electrodes 221 and 222 are preferably made of carbon, they could be made of other material which is both electrically conductive and consumable in the presence of electricity and an oxidizer (or in the presence of a fuel, when the hybrid heaters are reverse hybrid heaters). Preferably, the electrodes do not burn faster than the fuel in the hybrid heaters, so that the heaters can be started again using the electrodes should, for some reason, the hybrid heaters be turned off.

Hybrid heater 250 contains solid fuel 251 and an inlet 265 for allowing $GO_2$ to enter into hybrid heater 250. It can be attached in any conventional manner to motor 100 such that its combustion products are ejected into motor 100. The hybrid heater 250 uses hydroxyl-terminated polybutadiene (HTPB) as the fuel 251 and is run at an oxidizer-to-fuel mixture ratio of approximately 2.0. $GO_2$ (GOX—gaseous oxygen) enters the heater at the forward end vaporizing and burning the HTPB 251 as it passes down the grain. Hybrid heater 250 both ignites motor 100 and pre-heats the liquid oxygen coming out of LOX ($LO_2$—liquid oxygen) tank 20. As can be seen in FIG. 4, it is positioned at an angle firing into motor 100 adjacent the upper end 108 of motor 100.

An isolation valve 231 isolates $GO_2$ in tank 230 from gaseous oxygen feedline 236 for hybrid heater 250. There could optionally be included for sphere 230 a $GO_2$ fill/drain, vent/relief line such as line 33 for $GO_2$ tank 30, a $GO_2$ fill/drain, vent/relief vent such as vent 34 for $GO_2$ tank 30, and a ground interface/quick-disconnect valve such as valve 35 for $GO_2$ tank 30.

Ignition system 223 includes carbon electrodes 221 and 222, separated by a gap 226. Ignition systems 223 are used to ignite heaters 50, 90, and 250.

The gaseous oxygen in sphere 230 is used to oxidize the solid fuel 251 in hybrid heater 250, and hybrid heater 250 is used to ignite motor 100.

In operation, rocket 11 is assembled as shown, with sphere 30 having been filled via line 33 and valves 34 and 35, and sphere 40 having been filled via line 43 and valves 45. Initially the sphere 40 is filled and flushed with liquid nitrogen ($LN_2$) until the metal temperature is lowered to approximately 145° R. (−315° F.). The sphere 40 is then filled with GHe which has passed through a ground support equipment (GSE) heat exchanger to reduce the GHe temperature from its stored condition to approximately 150° R. (−310° F.) inside the sphere. The GHe sphere 40 pressure will decay from 3000 psia at ignition to 600 psia at the end of burn thus providing sufficient pressure to maintain the $LO_2$ tank 20 ullage pressure above the minimum requirement of 450 psia at the end of burn. The GHe temperature at the end of burn will be approximately 400° R. (−60° F.). Heating the gaseous helium from the cryogenic temperature at which it is stored causes its pressure to increase (PV=nRT), thereby contributing to the pressure necessary to force liquid oxygen out of tank 20. Sphere 230 can have been filled through valve 231 or through a valve and line system similar to valves 34 and 35 and line 33.

Initially, lines 36, 37, and 236 and motors 50, 90, and 250 are filled with an inert gas, such as helium. Electricity is supplied to electrodes 221 and 222 by any conventional, suitable means (not shown). For example, 50 V can be applied across gap 226, using a 30 amp, 400 hertz AC source. Since helium has a very high ionization potential, a voltage can be applied across gap 226 between electrodes 221 and 222 without creating an arc. This setup is stable and produces no safety hazard. When it is desired to ignite rocket 11, valves 31, 81, and 231 are opened. Gaseous oxygen then enters motors 50, 90, and 250, and the low ionization potential of the gaseous oxygen allows arc production across gap 226, causing rapid, high intensity combustion of the carbon which propagates to and ignites the hybrid fuel 51, 91, and 251, respectively. Heater 250 in turn ignites motor 100 by providing the heat necessary to ignite the combination of the oxygen supplied by tank 20 and the hybrid fuel 101 in motor 100.

Instead of the ignition arcs occurring when valves 31, 81, and 231 are opened, one could open valves 31, 81, and 231 in advance of ignition, and refrain from supplying electricity to electrodes 221 and 222 until it is desired to create the arcs when electricity is supplied to electrodes 221 and 222.

Heater 250 causes liquid oxygen entering the upper end 108 of motor 100 to vaporize into gaseous oxygen, so that $GO_2$, not $LO_2$, reacts with the hybrid fuel 101 in motor 100. The complex combustion and resulting instability and rough combustion associated with $LO_2$-fed systems is not present in the safe stable $GO_2$-driven hybrid.

The advantage of using helium stored at high pressure and low temperature, and then heating it, is that it expands rapidly and at a relatively high pressure.

The gas in sphere 30 is at a higher pressure than is the gas in sphere 40, which in turn is at a higher pressure than the required ullage pressure in tank 20, to ensure that the gases will flow in the desired direction.

Ignition system 224 (see FIGS. 6 and 7) is an alternative ignition system which could be used to ignite hybrid heaters 50, 90, 250. System 224 differs from system 223 in that a filament 225 replaces gap 226 of system 223. System 224 is part of alternative hybrid heater ignition system 240 for hybrid motor 100. It works in the same manner, however, in that a current can flow in the filament 225 without causing filament 225 to burn when the filament 225 is surrounded by something other than substantially pure oxygen or a strongly oxidizing gas (or something other than a fuel when the hybrid heaters are reverse hybrid heaters). When oxygen comes into contact with filament 225 when current (e.g., 15 amps supplied by a 24 V battery) is flowing therethrough, filament 225 burns, igniting heaters 50, 90, and 250 (assuming that system 224 replaces system 223 in each heater). However, system 223 is preferred because it can be used more than once, while in system 224 the filament 225 will need to be replaced after use before system 224 can be used again.

The hybrid helium pressurization system disclosed herein can be used for hybrid rockets and some liquid propulsion systems.

The hybrid helium pressurization system disclosed herein differs from Schuler et al. primarily in that: the present invention uses an inert gas (which is important to prevent burn-up of container 40 and is safer, too); in the present invention there is a separate container 40 for the pressurant, which allows the present invention to more easily have higher pressure; the heater exhaust in the present invention directly mixes with the gas, which is more efficient and helps maintain high pressure.

Figure 9:
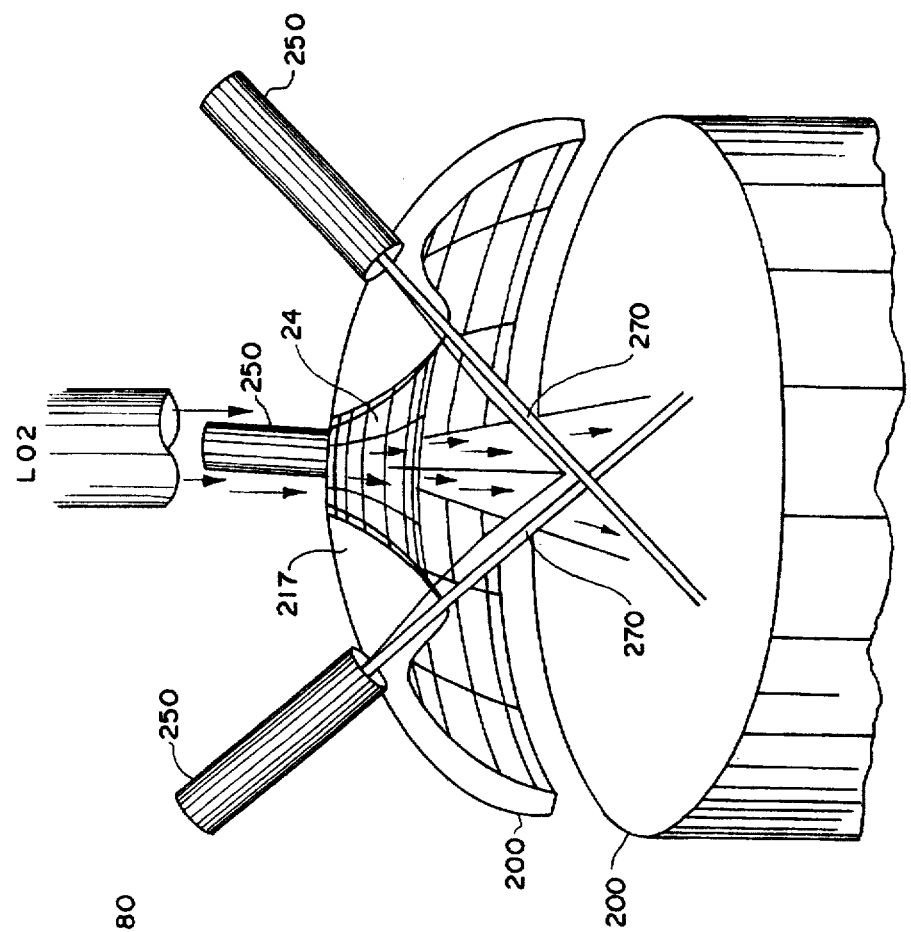
FIGS. 9 and 10 are details of the embodiment of FIG. 8, showing how the exhaust streams from the hybrid heaters intersect with one another and with the LO2 stream.
Figure 8:
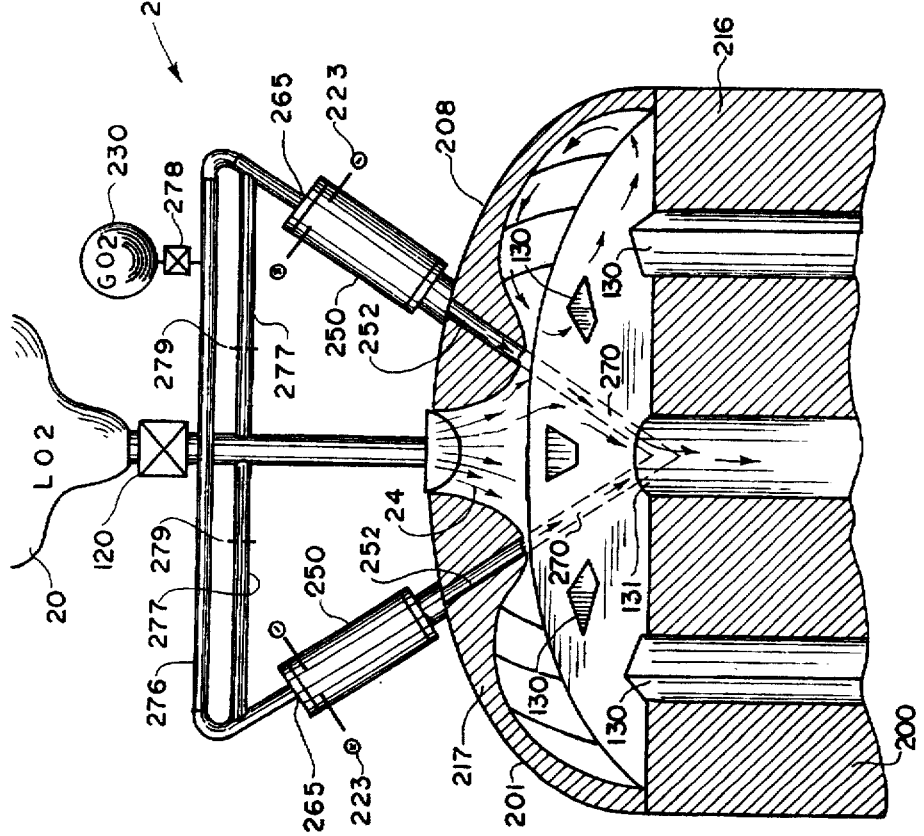
FIG. 8 is a cut-away view of another embodiment of the oxidizer vaporizer of the present invention.
Figure 10:
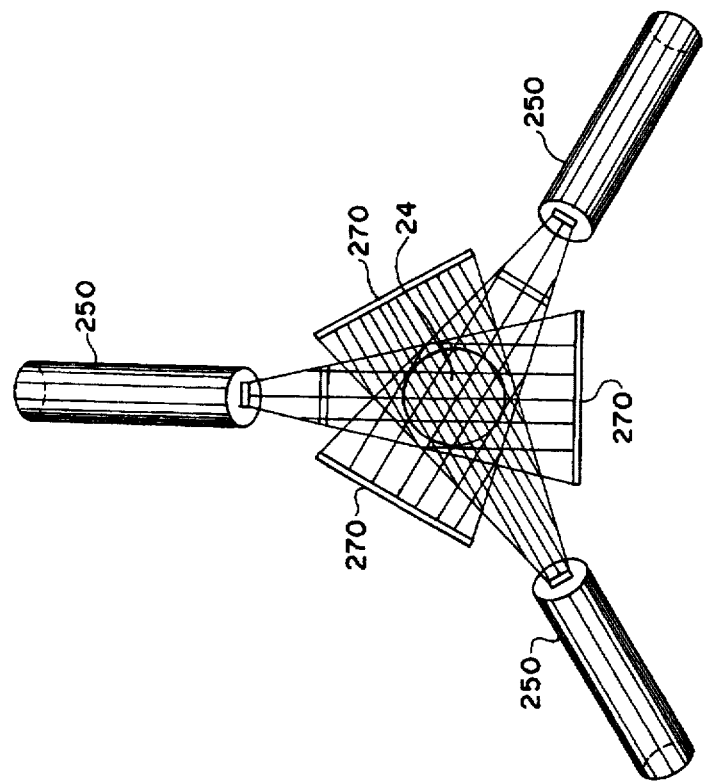

An alternative embodiment 280 of the vaporization system of the present invention is shown in FIGS. 8–10. Vaporization system 280 includes three (although more or fewer could be used) hybrid heaters 250 equally spaced apart around the forward end 208 of motor 200. Heaters 250 are oriented such that their exhaust streams 270 intersect with the LO2 stream 24. Appropriate piping and valves, including MOV (main oxygen valve) 120, piping 276 and 277, and GO2 valve 278, interconnect heaters 250 with GO2 tank 230 and LO2 tank 20. Piping 276 and 277 includes orifices 279 to limit the flow of LO2 therethrough so that the change in pressure across orifices 279 is high enough that there is no flow backward through orifices 279 into piping 276 and 277 and so that the majority of the LO2 enters the rocket through injector 375.

Cylindrical bores 252 in substantially multi-toroidal shaped portion 217 of fuel 201 allow exhaust streams 270 to pass through portion 217 and impinge upon the upper surface of portion 216.

The GO2 (gaseous oxygen) driven heaters 250 can be electrically ignited, and run safely without introducing a hazard. As the heaters 250 heat up the head end 208 of the motor 200, the fuel surfaces impinged upon in the head end 208 will begin to produce flammable vapor. Shortly after the GO2 heaters 250 have been confirmed lit, the LO2 is introduced from tank 20 and the flame quickly and smoothly fills the hybrid motor 200 from the front 208 to the back, self limited by the heat transfer to the hybrid fuel 201. Because the hot gas exhaust 270 from the heaters 250 is fuel rich vapor, it is swept along with the advancing oxygen flow and no unburned fuel can accumulate in the motor 200. The full motor ignition will ramp up smoothly as the surfaces of the fuel 201 heat up to steady state. The presence or absence of a motor purge with inert gas will not appreciably affect the ignition transient. The orientation of the motor 200 (whether horizontal, vertical, or in zero-G) will not affect the ignition transient.

As described above, the challenge is to heat the LO2 up to near ambient temperature so that the burning at the entrance of the ports 130 and 131 is not subject to quenching due to the presence of LO2 or low temperature oxygen. This allows the full length of the ports 130, 131 to burn as well as minimize the negative combustion stability impact.

The GO2-driven hybrid motors 250 are employed to heat the head end 208 of the motor 200 to ensure that all of the LO2 is vaporized before entering the ports 130, 131. Since the entire port 130, 131 is operating at a temperature which can support combustion, the low frequency instability will not be present. Even if the LO2 were not all vaporized by exhaust streams 270, heaters 250 would still be useful and desirable because the exhaust streams 270 from heaters 250 help heat the surface of the fuel 201 to keep fuel vapor available for combustion with the O2 which does vaporize.

The LO2 stream 24 entering the motor 200 is directed through the exhaust 270 of one (or more) hybrid heaters 250 which heats the LO2 to near ambient temperature. Preferably more than one hybrid heater 250 is used (as in FIGS. 8–10). Also, the hybrid heaters 250 are preferably oriented such that their exhaust streams 270 all intersect the LO2 stream 24.

The mixture ratio of the GO2 driven hybrid heaters 250 is selected such that full energy release in combustion is not realized until the exhaust is mixed with the main LO2 oxidizer flow (slightly fuel rich). The resulting interaction of heat added to the flow, and heat created within the flow through combustion will increase the temperature of the oxygen stream 24 such that all of the oxygen is vaporized and heated to near ambient temperature.

One method of achieving the results is to operate the small ignition/vaporization motor(s) 250 using GO2 for the entire duration of the flight (burn). This is advantageous for the following reasons:

(1) Because of the high heat of combustion of the hybrid fuel 251 in hybrid heaters 250, the total fuel 251 burned, and consequently the quantity of GO2 required, is relatively small. For example, it takes 155 BTUs to raise the temperature of 1 lb of LO2 to ambient temperature at a typical operating pressure of 750 psi. For example, a large hybrid motor 100 six feet in diameter that produces 400K lb of thrust consumes 1000 lb/sec of LO2. To heat the LO2 up to the desired temperature, 1000×155 or 155,000 BTU/sec would be required. The heat of combustion of HTPB is approximately 20,000 BUT/lb. If all heat were to be supplied by the motors 250, the amount of HTPB required for each second of operation would be 7.75 lb. The amount of fuel available for burning from the surface of a hemispherical head end 108 at the typical regression rate of 0.030 inches/sec is 14 lbm/sec., if the temperature were high enough to sustain the surface temperature in the fuel vapor producing range. Assuming that no more than half of the heat necessary must come from the GO2 driven ignition/vaporization motors 250, that three of them are required, and that they operate at a mixture ratio of 1.5 (oxidizer/fuel), 1.3 lb/sec of HTPB and 1.9 lb/sec of GO2 would be required from each heater 250 for sustained operation.

(2) The probability that the heat is introduced in the proper region (the head end 208) is very high since it is introduced to the LO2 stream 24 at very high temperature (high thermal gradient yields high heat transfer and high velocity yields good mixing).

(3) Since all of the oxygen is vaporized in the head end 108, the flux level of the motor 200 can be significantly increased without combustion stability problems, resulting in a smaller, higher performance motor.

A different approach is to use the GO2 only to start the ignition/vaporization heater(s) 250 and then transition them over to LO2 operation after a short period of time. Because they are small, these heaters operate with a very low flux. After the ignition/vaporization heaters 250 have reached steady state, they could be transitioned over to operation using LO2. Since the heaters 250 are already generating vaporized fuel, they can be satisfactorily run using LO2. In order to get the LO2 to flow properly into the motor 200, the pressure drop across the injector of the main hybrid motor 200 would have to be higher than that of the smaller heaters 250. Due to the differences in flux, this is an acceptable condition. If operated in this manner, the amount of high pressure GO2 required for operation of the system would be very small, and thus a smaller (and lighter) GO2 tank 230 could be used. Otherwise, a relatively large (heavy, but safe) GO2 bottle is needed if heaters 250 run off of GO2 for the whole burn.

Initial tests indicate that very little GO2 is needed to vaporize the LOX enough to significantly reduce combustion oscillations in the rocket. It has been found that a ratio of 1:400 (1 pound of gaseous oxygen per 400 pounds of LO2) is sufficient to vaporize enough of the LOX that there are virtually no combustion chamber oscillations. Using a ratio of 0.05 lbm/sec of GO2 with 5 lbm/sec of LO2, between T=6 sec and T=8 sec during a burn, the average chamber pressure was about 470. The chamber pressure varied from about 460 psi to about 480 psi (a variation of about 20 psi—about 4% of the average chamber pressure); without the GO2, for the same time period and about the same average chamber pressure, the chamber pressure varied from about 410 psi to about 530 psi (a variation of about 120 psi—about 25% of the average chamber pressure). So little gaseous oxygen is needed that, for the sake of simplicity, it may be preferred to simply use gaseous oxygen from tank 230, and not convert to LOX after ignition.

A single heater 250, when used with the system of FIGS. 4–7, could be large enough to provide all the heat that is necessary to vaporize the LO2 as it enters motor 100. In such a case, GO2 tank 230 would need to be large enough to hold enough oxygen to keep heater 250 burning during the entire rocket burn, or means similar to those shown in FIG. 8 could be used to supply LO2 to heater 250. Preferably, however, multiple heaters 250 are used, such as the three shown in FIGS. 8–10. Preferably, there is a redundancy in the system such that, for example, when three heaters 250 are used, enough heat is supplied by two of them to vaporize all of the LO2. Also, instead of three extra penetrations being made in the motor case, one could instead enlarge the penetration through which the LO2 enters the motor case and position the heaters 250 in that penetration. The multiple penetrations are preferred, however, because it is believed that better mixing of hot combustion gas from the heaters 250 and the LO2 occurs with that option. Regardless of which option is chosen, preferably the heaters 250 are allowed to burn long enough to fill the front of motor 200 with hot fuel-rich gas before the LO2 enters the motor 200.

Figure 11:
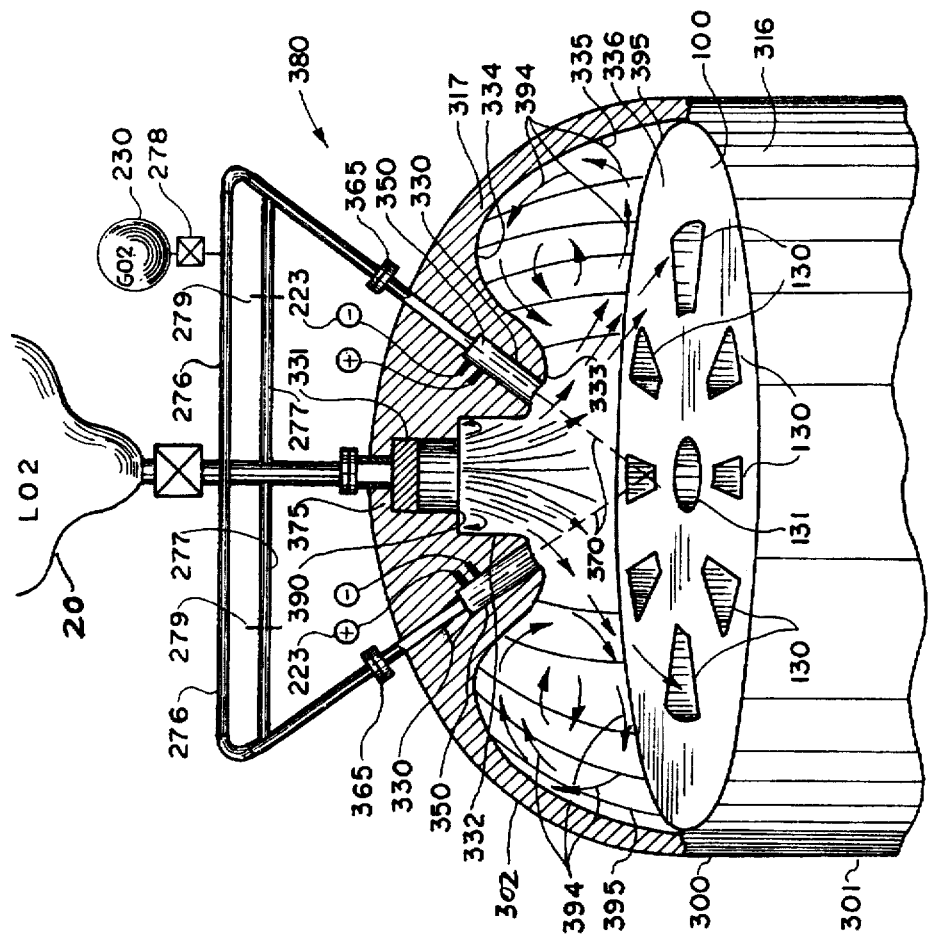
FIG. 11 is a cut-away view of the another embodiment of the oxidizer vaporizer of the present invention.

FIG. 11 shows a preferred embodiment of the oxidizer vaporizer of the present invention, vaporizer 380.

In FIG. 11, motor 300 includes a casing 302 and hybrid fuel both in a substantially cylindrical portion 316 in the substantially cylindrical, aft portion of the casing 302 of motor 300 and a substantially multi-toroidal-shaped portion 317 in the forward end of casing 302 of motor 300.

In FIG. 11 hybrid heaters 350 (two of which are shown in FIG. 11, but any number could be used; three, for example, will probably be used) are used to ignite motor 300. Hybrid heaters 350 comprise cylindrical openings 330 formed in substantially multi-toroidal-shaped portion 317 of solid fuel 301 in the front end of motor 300, and this solid fuel provides the fuel for hybrid heaters 350. There are inlets 365 to allow GO$_2$ to enter hybrid heaters 350. The exhaust stream 370 from hybrid heater 350 works in the same way as exhaust stream 270 to heat up liquid oxygen entering motor 300.

Hybrid heaters 350 are the preferred hybrid heaters to practice the present invention because having the heaters 350 in motor 300 itself eliminates additional hot-gas interfaces that are present when the hybrid heaters used to vaporize the LOX are on the outside of motor 300.

The Coanda effect (the Coanda effect occurs when a jet of fluid is injected into a wide container and due to some disturbance in flow or shape of the container the jet stream moves to one wall or other of the container and continues to flow along that wall; as long as the flow is not otherwise disturbed, the flow remains "locked" onto the wall of the container) extracts GO2 out of the LO2 entering through injector 375 and a rearward facing step 390 holds the flame due to the low flux of oxygen adjacent step 390. The GO2 enters the motor 300 through stainless steel pipes and burns rubber fuel 301 from inside motor 300. The head end portion 317 of the hybrid fuel 301 of motor 300 preferably has a contoured shape designed to promote circulation, such as the multi-toroidal shape shown in FIGS. 8, 9, and 11, to hold flame and circulate fuel rich products into the flow. The shape shown in FIGS. 8, 9, and 11 facilitates the flow of GO2 from the incoming LO2 stream into the low-flux regions 395 of motor 300 (arrows 394 indicate the flow of the GO2 in this region).

With reference particularly to FIG. 11, the head end portion 317 of fuel 301 is substantially hemispherically shaped on its forward end. The aft end of head end portion 317 is the one which is shaped to particularly encourage retention of a steady flame as far forward in hybrid motor 300 as possible. The aft end of head end portion 317 includes a central cylindrical bore 331 in which is imbedded injector 375 through which LO2 enters motor 300. Concentric with and adjacent this bore is a second, larger diameter bore 332 which provides a rearward facing step 390 which holds the flame generated by the combustion of GO2 and the hybrid fuel 301 in motor 300. Concentric with and adjacent this second bore 332 is an aft-projecting toroidal surface 333. Aft-projecting toroidal surface 333 is surrounded by a forward projecting, concentric toroidal surface 334. Forward projecting toroidal surface 334 merges with and is surrounded by concentric choroidal surface 335 of forward portion 317 of fuel 301. Choroidal surface 335 of portion 317 of fuel connects with the forward surface 336 of portion 316 of fuel 301. While the LO2 tends to flow into ports 130 and 131, the GO2 separating from the LO2 stream tends to flow outward from bore 332 and go in the direction of arrows 394 and follow the toroidal surfaces 333 and 334 and surface 335 (which is the lower section of a hemisphere).

The purpose of forward portion 317 of fuel 301, like portion 217, is to create a "cloud" of fuel-rich vapor which is carried by the LOX into the area where it is needed to mix with GOX and burn, to help vaporize the LOX.

Perhaps a swirl-type LOX injector would work better than the shower-head type injector 375 shown in FIG. 11, as the LOX droplet size would be reduced, thus allowing the LOX to vaporize more easily.

Because the rearward facing step 390 holds the flame, and because the GO2 flows along surfaces 335, 334, and 333, a uniform flame covers all surfaces of portion 317, including the surface of bore 332, surfaces 333, 334, and 335, and this flame helps to heat and vaporize the O2 entering through injector 375, and facilitates a uniform flame over the surface 336 of portion 316 of fuel 301. This flame over surface 336 helps to ensure a uniform flame inside ports 130 and 131.

The aft end of head end portion 317 of the hybrid fuel 301 of motor 300 is shaped as it is to follow the natural flow pattern of gaseous oxygen flowing out of the LO2 entering hybrid motor 300 to achieve the most efficient burning of the gaseous oxygen possible in the forward end of the hybrid motor 300. There is preferably provided an amount of fuel in the head end portion 317 to ensure that, as long as portion 316 is burning, there will be a flame front on head end portion 317 (in other words, portion 316 of fuel 301 will finish burning before portion 317 is consumed). This ensures that there will be no frequency oscillations as in prior hybrid rockets (or at least that they will be minimized). As an example, if there are 30,000 pounds of hybrid fuel in portion 316, there are preferably at least 300 pounds of hybrid fuel in portion 317.

It is not necessary to vaporize all of the LOX as it enters motor 300—it is only necessary to heat the incoming LOX a sufficient amount to hold the flame stationary at the front of motor 300.

The hybrid heater vaporization system 380 of FIG. 11 is preferred to that of FIGS. 8–10 because system 380 is simpler (i.e., requires fewer parts).

Arc-producing ignition system 223 is preferably used to ignite hybrid heaters 250 and 350 in the systems shown in FIGS. 8–11.

Although not shown in FIGS. 8–10, motor 200 can include a diffuser 375 as shown in FIG. 11.

Figure 12:
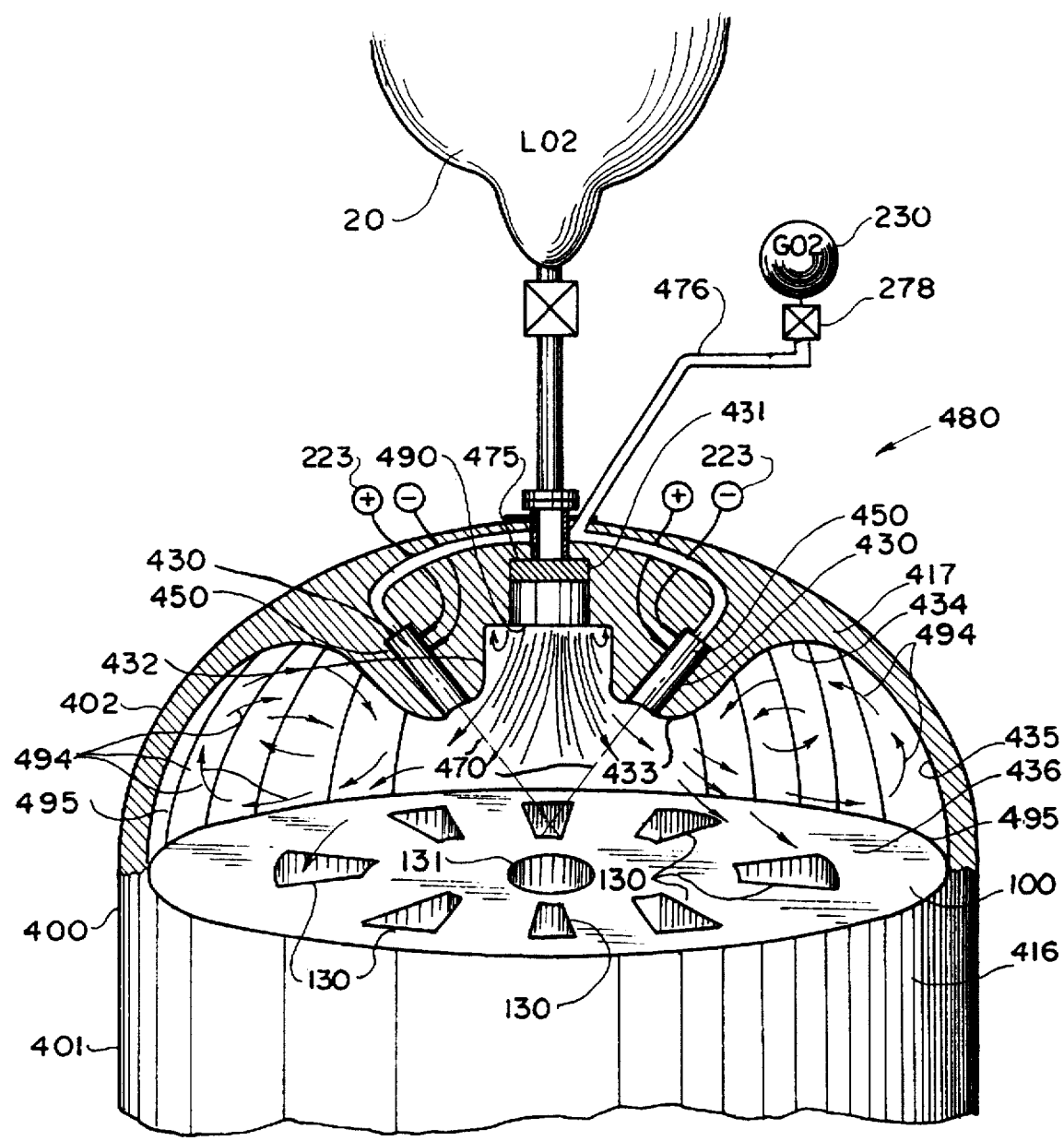
FIG. 12 is a cut-away view of the preferred embodiment of the oxidizer vaporizer of the present invention.

FIG. 12 shows hybrid heater vaporization system 480, the preferred vaporization system of the present invention.

System 480 includes a motor 400 containing fuel 401 therein. Elements in FIG. 12 beginning with a "4" correspond to similar elements in FIG. 11 beginning with a "3", and function the same unless specified otherwise.

The major difference between system 380 and system 480 is that in system 480, there is a single hole in the casing 402 at the forward end of motor 300, and all piping comes through this hole. This is preferable to having multiple penetrations in the motor casing 402 because each penetration is a potential failure point. Gaseous oxygen travels from tank 230 via valve 278 and piping 476, through the single hole at the forward end of motor casing 402, to cylindrical openings 430 formed in substantially multi-toroidal-shaped portion 417 of solid fuel 401 in the front end of motor 400.

Exemplary dimensions for the apparatus of the present invention are as follows:

length of oxidizer tank 20—300.0 inches;
amount of LOX: 40,000 lbm;
length of motor 100 (from first end 108 to second end 109 (upper end of nozzle 111))—385.5 inches;
length of rocket case 115—867.0 inches;
diameter of rocket case 115—74 inches;
distance from upper tip of rocket case 115 to lower end of nozzle 111—946.93 inches;
largest diameter of nozzle 111—62.4 inches;
amount of hybrid fuel in portion 316: 19,800 lbm;
amount of hybrid fuel in portion 317: 200 lbm;
diameter of gaseous helium sphere 40—46 inches;
amount of helium in sphere 40: 200 lbm;
wall thickness of gaseous helium sphere 40—0.5 inch;
diameter of gaseous oxygen sphere 30—16 inches;
amount of gaseous oxygen in sphere 30: 50 lbm;
diameter of gaseous oxygen sphere 230—24 inches (when heaters 250 are GO2 driven during entire burn);
amount of gaseous oxygen in sphere 230 (when heaters 250 are GO2 driven during entire burn): 200 lbm (due to pressure reduction as the gaseous oxygen leaves sphere 230, only about half of the oxygen leaves the sphere);
diameter of gaseous oxygen sphere 230—12 inches (when heaters 250 switch to LO2 after ignition);
amount of gaseous oxygen in sphere 230 (when heaters 250 switch to LO2 after ignition): 20 lbm
diameter of hybrid heaters 250—8 inches;
length of hybrid heaters 250—24 inches;
diameter of orifices 279—0.08 inch;
diameter of bore 330 of hybrid heaters 350—2⅔ inches;
length of bore 330 of hybrid heaters 250—8 inches.

Other propellants, such as nitrogen (or oxygen when oxygen is the fuel component being propelled), which do not react with the fuel component being propelled, could be used instead of helium as the propellant in the system of the present invention. However, helium is the most preferable propellant, for both safety and efficiency reasons.

As used herein, "LOX", "LO2", and "LO$_2$" refer to liquid oxygen, and "GOX", "GO2", and "GO$_2$" refer to gaseous oxygen.

As used herein, "propellant component" refers to a component in a rocket which causes the rocket to be propelled; it can be either an oxidizer (such as oxygen) or a fuel, such as HTPB or kerosene.

As used in the claims, "hybrid heater" includes "normal" hybrid heaters (solid fuel, fluid oxidizer) as well as "reverse" hybrid heaters as well (a reverse heater is one which has a solid oxidizer and fluid fuel).

As used herein, "vaporization" can also refer to decomposition on oxidizers or other propellant components which benefit from decomposition (such as hydrogen peroxide or nitrous oxide).

When the hybrid heaters are normal hybrid heaters, the oxidizer for the hybrid heaters preferably is one which produces vigorous and reliable combustion; the preferred oxidizer for the hybrid heaters is GOX.

One could use in the hybrid heaters a fuel which produces more heat than (is more energetic than) HTPB (such as magnesium-filled HTPB) in the hybrid heater. As an example, in FIG. 12, heaters 450 could each include a cylinder of magnesium-filled HTPB having a 1" inner diameter and a 4" outer diameter. In this manner, less oxidizer would be required, making the vaporization system smaller and lighter.

The vaporization system of the present invention produces a combustion stability heretofore unknown in hybrid rocket technology. The troublesome oscillations present in other hybrid rocket systems are absent in the hybrid rocket system of the present invention. The vaporization system of the present invention makes hybrid rockets practical for aerospace applications.

The foregoing embodiments are presented by way of example only; the scope of the present invention is to be limited only by the following claims.

I claim:

1. Apparatus including a hybrid heater pressurization system and an ignition/vaporization system, for a rocket comprising a first fluid propellant component and a second propellant component, wherein the second propellant component is in a casing,
    (a) the pressurization system comprising pressurization means, for forcing the first fluid propellant component into contact with the second propellant component, the pressurization means comprising:
        (i) a gas initially stored at a cryogenic temperature;
        (ii) a first hybrid heater having combustion products when ignited for heating the gas by mixing the combustion products of the first hybrid heater with the gas;
        (iii) diffuser means for introducing the heated gas into a container containing the first fluid propellant component,
    (b) an ignition/vaporization means comprising:
        (i) a second hybrid heater having combustion products when ignited, the second hybrid heater being positioned such that the combustion products of the second hybrid heater are directed into the casing of the second propellant component for vaporization of the first fluid propellant component when the second hybrid heater is ignited; and
        (ii) means for igniting the second hybrid heater.

2. The apparatus of claim 1, wherein the gas is inert.

3. The apparatus of claim 2, wherein the inert gas is helium.

4. The apparatus of claim 1, wherein the rocket is a hybrid rocket.

5. The apparatus of claim 1, further comprising the rocket.

6. The apparatus of claim 5, wherein the rocket is a hybrid rocket.

7. The apparatus of claim 1, wherein:
    the first fluid propellant component enters the casing in a stream, the second hybrid heater produces an exhaust stream when ignited, and the second hybrid heater is positioned such that its exhaust stream intersects the stream of the first fluid propellant component.

8. The apparatus of claim 1, wherein the rocket has a burn of a duration, and the apparatus further comprises:
   means for directing a sufficient quantity of O2 into the second hybrid heater to allow the second hybrid heater to burn during substantially the entire duration of the rocket burn.

9. The apparatus of claim 8, further comprising means for directing some of the fluid propellant component into the second hybrid heater.

10. The apparatus of claim 1, further comprising:
    third and fourth hybrid heaters having combustion products when ignited, the third and fourth hybrid heaters being positioned such that the combustion products of the third and fourth hybrid heaters are directed into the casing of the second propellant component when the third and fourth hybrid heaters are ignited; and
    means for igniting the third and fourth hybrid heaters.

11. Apparatus including a vaporization system for a rocket, the rocket comprising a first fluid propellant component and a second propellant component, wherein the second propellant component is in a casing, and the vaporization system comprises: a first hybrid heater having combustion products when ignited, the hybrid heater being positioned such that the combustion products of the hybrid heater are directed into the casing of the second propellant component when the hybrid heater is ignited for vaporization of substantially all the first fluid propellant component; and means for igniting the hybrid heater.

12. The apparatus of claim 11, wherein:
    the means for igniting the hybrid heater is an arc-producing means.

13. The apparatus of claim 12, wherein:
    the arc-producing means produces no arc when in an inert-gas environment.

14. The apparatus of claim 13, wherein:
    the arc-producing means includes a carbon electrodes.

15. The apparatus of claim 11, further comprising the rocket.

16. The apparatus of claim 15, wherein the rocket is a hybrid rocket.

17. The apparatus of claim 15, further comprising a rocket case in which are contained the first fluid propellant component and the second propellant component.

18. The apparatus of claim 11, wherein:
    the first fluid propellant component enters the casing in a stream, the hybrid heater produces an exhaust stream when ignited, and the hybrid heater is positioned such that its exhaust stream intersects the stream of the first fluid propellant component.

19. The apparatus of claim 11, wherein the rocket has a burn of a duration, and the apparatus further comprises:
    means for directing a sufficient quantity of a propellant component into the hybrid heater to allow the hybrid heater to burn during substantially the entire duration of the rocket burn.

20. The apparatus of claim 19, further comprising means for directing some of the fluid propellant component into the hybrid heater.

21. Apparatus including a vaporization system for a rocket, the rocket comprising a first fluid propellant component and a second propellant component, wherein the second propellant component is in a casing, and the vaporization system comprises:

first, second, and third hybrid heaters having combustion products when ignited, the first, second, and third hybrid heaters being positioned such that the combustion products of the first, second, and third hybrid heaters are directed into the casing of the second propellant component when the first, second, and third hybrid heaters are ignited; and
means for igniting the first, second, and third hybrid heaters.

22. A system for improving combustion of a hybrid rocket containing a solid fuel in a casing by gasifying liquid oxygen as the liquid oxygen enters the casing in a stream, before the oxygen contacts the solid fuel, comprising:
   (a) a first oxygen-driven hybrid heater having an exhaust stream which intersects and mixes directly with and vaporizes the liquid oxygen stream as the liquid oxygen stream enters the casing;
   (b) means for igniting the hybrid heater, and the hybrid heater containing a sufficient quantity of hybrid fuel and a sufficient quantity of oxygen to enable vaporization of substantially all of the liquid oxygen.

23. A system for improving combustion of a hybrid rocket containing a solid fuel in a casing by gasifying liquid oxygen as the liquid oxygen enters the casing in a stream, before the oxygen contacts the solid fuel, comprising:
   (a) first, second, and third oxygen-driven hybrid heaters, each having an exhaust stream which intersects and mixes directly with and vaporizes the liquid oxygen stream as the liquid oxygen stream enters the casing;
   (b) means for igniting the first, second, and third hybrid heaters, and the hybrid heaters containing a sufficient quantity of hybrid fuel and a sufficient quantity of oxygen to enable vaporization of substantially all of the liquid oxygen.

24. The apparatus of claim 23, wherein:
    the casing includes a substantially cylindrical aft portion and a forward portion, and the solid fuel includes a substantially cylindrical portion in the cylindrical portion of the casing and a portion in the forward portion of the casing having a shape which promotes circulation.

25. The apparatus of claim 24, wherein:
    the first, second and third hybrid heaters are formed in solid fuel in the rocket.

26. A system for improving combustion of a hybrid rocket containing a solid fuel in a casing by gasifying liquid oxygen as the liquid oxygen enters the casing in a stream, before the oxygen contacts the solid fuel, comprising:
   (a) a first oxygen-driven hybrid heater having an exhaust stream which intersects and mixes directly with and vaporizes the liquid oxygen stream as the liquid oxygen stream enters the casing;
   (b) means for igniting the hybrid heater, and the hybrid heater containing a sufficient quantity of hybrid fuel and a sufficient quantity of oxygen to enable vaporization of substantially all of the liquid oxygen, wherein: the casing includes a substantially cylindrical aft portion and a forward portion, and the solid fuel includes a substantially cylindrical portion in the cylindrical portion of the casing and a portion in the forward portion of the casing having a substantially multi-toroidal shape.

27. The apparatus of claim 26, wherein:
    the hybrid heater is formed in solid fuel in the rocket.

* * * * *